US010323421B1

(12) United States Patent
Gold

(10) Patent No.: US 10,323,421 B1
(45) Date of Patent: Jun. 18, 2019

(54) TEMPLATE FOR A ROUTER TO NOTCH A DOOR LATCH SLOT

(71) Applicant: Michael Gold, Chandler, AZ (US)

(72) Inventor: Michael Gold, Chandler, AZ (US)

( * ) Notice: Subject to any disclaimer, the term of this patent is extended or adjusted under 35 U.S.C. 154(b) by 366 days.

(21) Appl. No.: 15/213,538

(22) Filed: Jul. 19, 2016

(51) Int. Cl.

| | |
|---|---|
| ***B25B 3/00*** | (2006.01) |
| ***E04F 21/00*** | (2006.01) |
| ***B23Q 9/00*** | (2006.01) |
| ***B27F 5/12*** | (2006.01) |

(52) U.S. Cl.
CPC .......... *E04F 21/003* (2013.01); *B23Q 9/0042* (2013.01); *B27F 5/12* (2013.01)

(58) Field of Classification Search
USPC ............. 269/1, 2, 289 R; 144/144.1, 144.52, 144/144.51
See application file for complete search history.

(56) References Cited

U.S. PATENT DOCUMENTS 310,710 A 1/1885 Nichols
3,559,704 A 2/1971 Thompson
4,235,268 A * 11/1980 Savary ..................... B25D 3/00 144/27
4,815,215 A 3/1989 Saylor
5,154,214 A * 10/1992 Hagerman ................ B27F 5/12 144/144.51
D356,271 S 3/1995 Kdamik
5,433,009 A * 7/1995 Keels, Jr. .................. B27F 5/12 144/144.51
5,524,684 A * 6/1996 Stuckel ................ B23Q 35/102 144/144.1
7,896,040 B2 * 3/2011 Gill ......................... B23B 47/28 144/144.1
2008/0142119 A1 6/2008 Ponce
2014/0133929 A1 5/2014 Smith

FOREIGN PATENT DOCUMENTS

WO 8810177 A1 12/1988

* cited by examiner

*Primary Examiner* — Joseph J Hail
*Assistant Examiner* — Shantese L McDonald

(57) ABSTRACT

The template for a router to notch a door latch slot is a jig that is adapted for use in routing slots in door slab such that the door slab can receive a latch. The template for a router to notch a door latch slot is clamped to the door slab such that an aperture formed in the template for a router to notch a door latch slot is positioned over the lock rail of the door slab. The aperture can then be used as a template for the router to create a door latch slot to receive the latch plate of the door lock. The template for a router to notch a door latch slot comprises a U channel, a pressure plate, and a thumb-screw.

10 Claims, 5 Drawing Sheets

TEMPLATE FOR A ROUTER TO NOTCH A DOOR LATCH SLOT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of tools for working and preserving wood or similar materials, more specifically, a tool for slotted or mortised work.

SUMMARY OF INVENTION

The template for a router to notch a door latch slot is a jig that is adapted for use in routing slots in door slab such that the door slab can receive a latch plate. The template for a router to notch a door latch slot is clamped to the door slab such that an aperture formed in the template for a router to notch a door latch slot is positioned over the edge of the door slab. The aperture can then be used as a template for the router to create a door latch slot to receive the latch plate of the door lock.

These together with additional objects, features and advantages of the template for a router to notch a door latch slot will be readily apparent to those of ordinary skill in the art upon reading the following detailed description of the presently preferred, but nonetheless illustrative, embodiments when taken in conjunction with the accompanying drawings.

In this respect, before explaining the current embodiments of the template for a router to notch a door latch slot in detail, it is to be understood that the template for a router to notch a door latch slot is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the template for a router to notch a door latch slot.

It is therefore important that the claims be regarded as including such equivalent construction insofar as they do not depart from the spirit and scope of the template for a router to notch a door latch slot. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
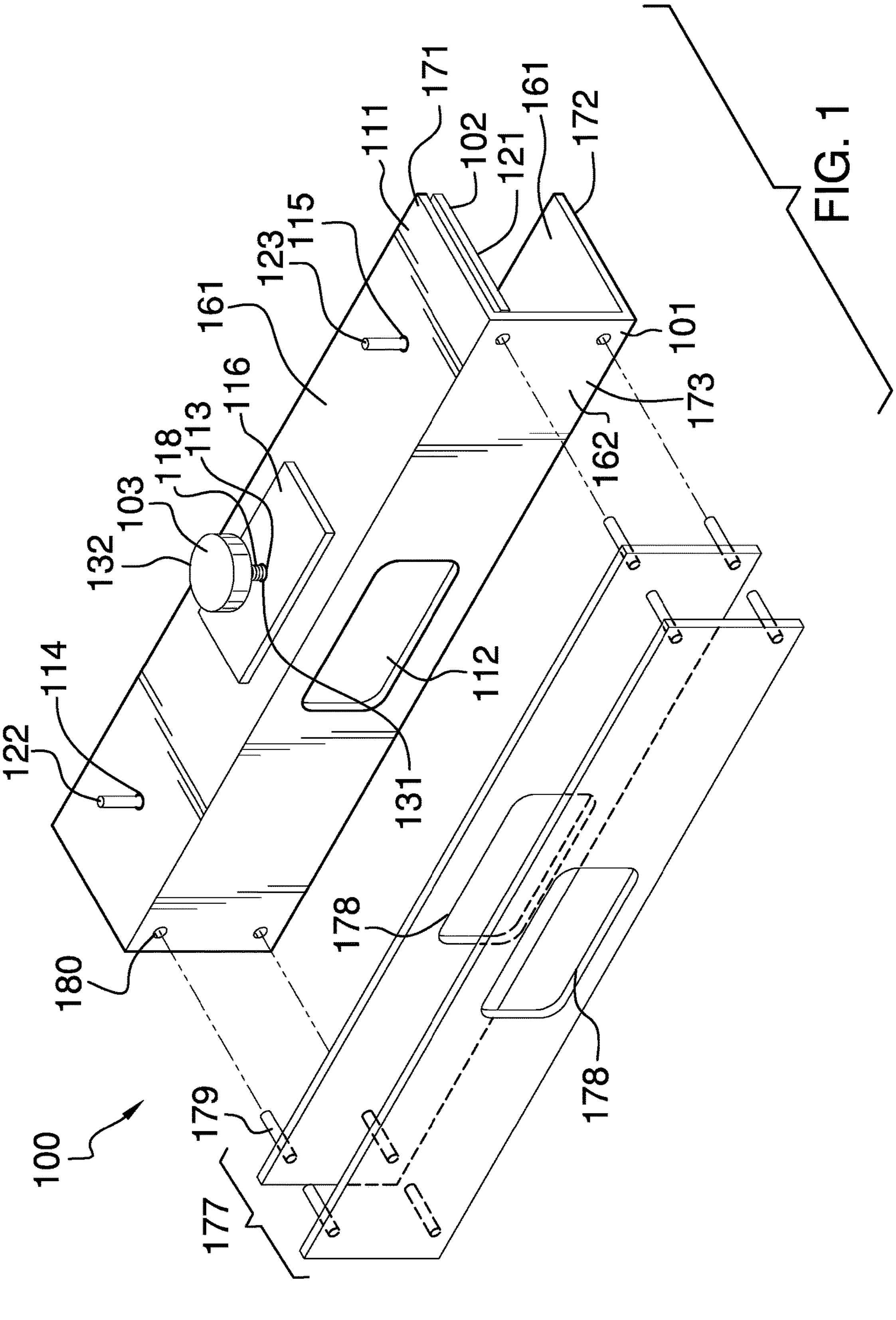
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 6.

The template for a router to notch a door latch slot 100 (hereinafter invention) comprises a U channel 101, a pressure plate 102, and a thumbscrew 103. The invention 100 is a jig that is adapted for use in routing slots in a door slab 151 such that the door slab 151 can receive a latch plate. The invention 100 is clamped to the door slab 151 such that an aperture 112 that is formed in the invention 100 is positioned over and clamped to the edge 152 of the door slab 151. The aperture 112 is used as a template for the router to create a door latch slot that receives the latch plate of a door lock or a door latch set.

The U channel 101 is a U shaped structure that formed to fit around the edge 152 of the door slab 151. The U channel 101 comprises a clasp frame 111, an aperture 112, a thumbscrew hole 113, a first guide hole 114, and a second guide hole 115. The clasp frame 111 is the base of the U channel 101 and provides the characteristic U shape of the U channel 101. The clasp frame 111 comprises a first arm 171, a second arm 172, and a connector 173 which are clearly identified in FIG. 3. The clasp frame 111 is further defined with six rectangular surfaces that are referred to as a first surface 161, a second surface 162, a third surface 163, a fourth surface 164, a fifth surface 165, and a sixth surface 166.

Figure 3:
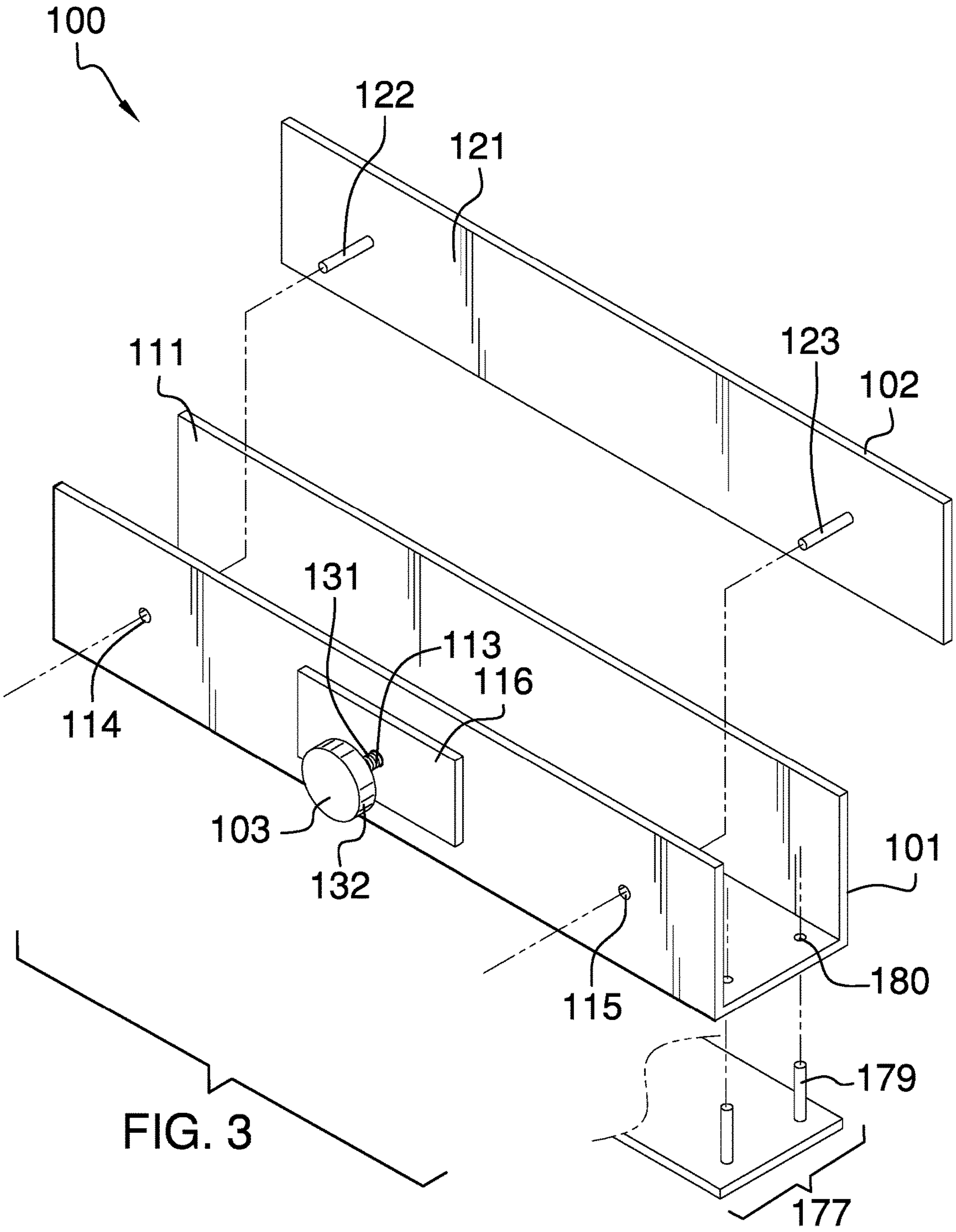
FIG. 3 is an exploded view of an embodiment of the disclosure.
Figure 4:
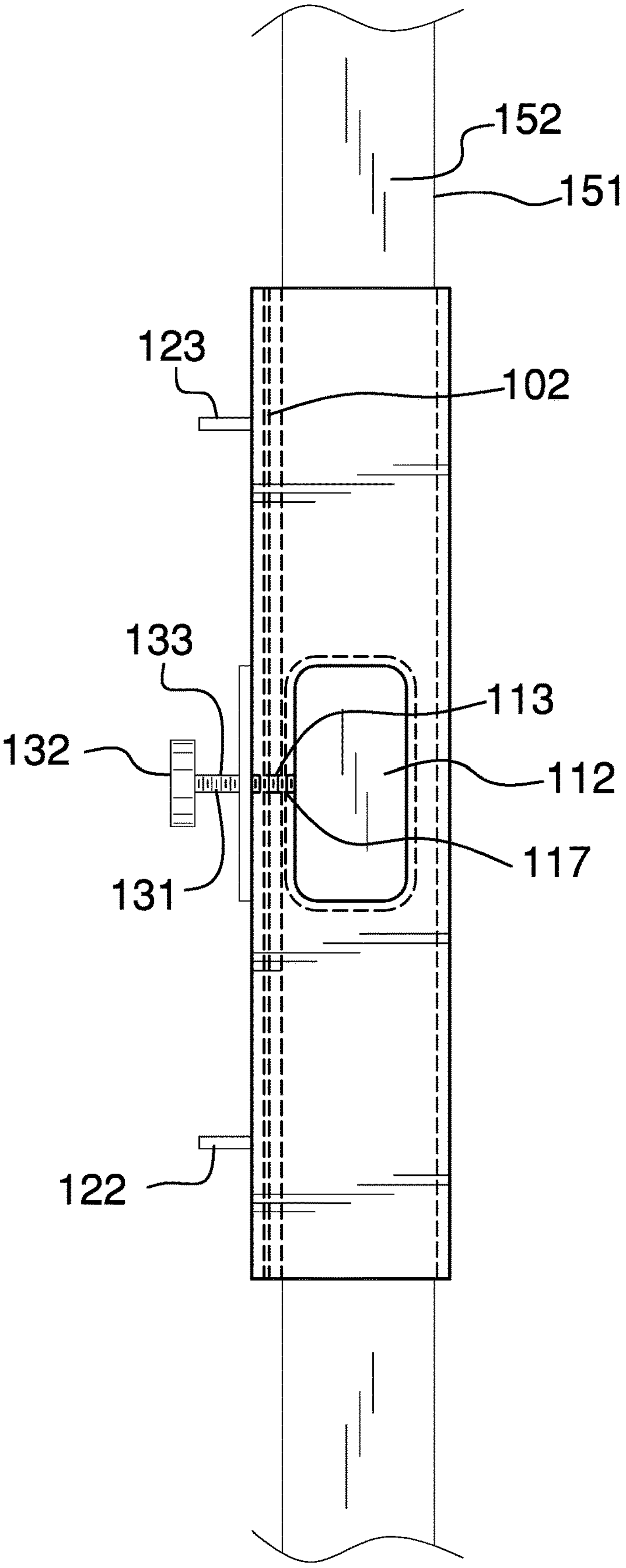
FIG. 4 is a front view of an embodiment of the disclosure.
Figure 5:
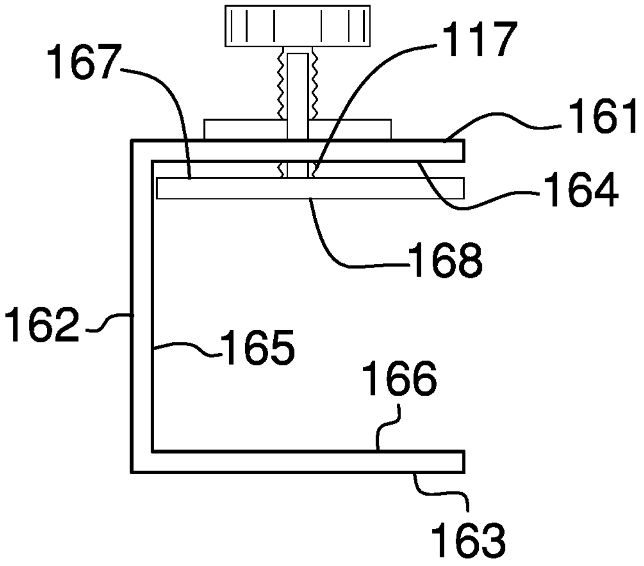
FIG. 5 is a side view of an embodiment of the disclosure.
Figure 6:
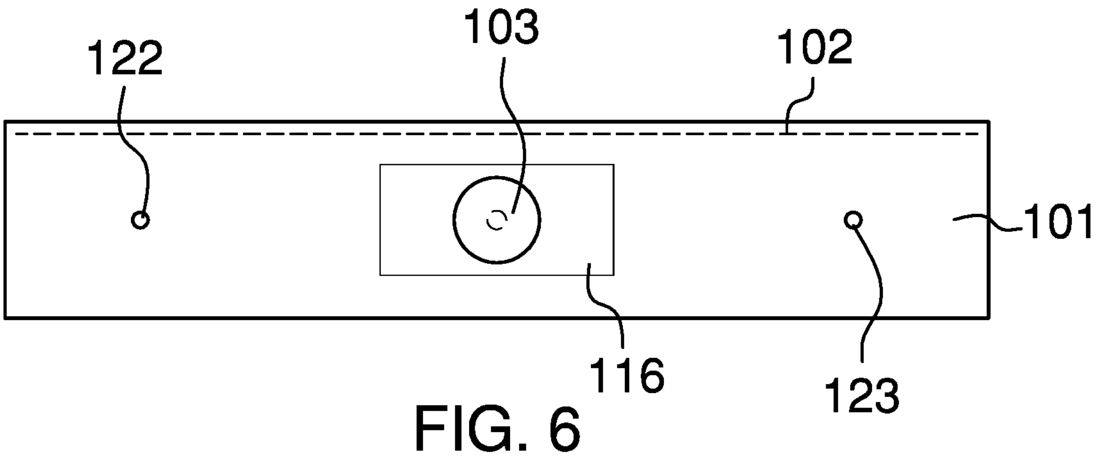
FIG. 6 is a top view of an embodiment of the disclosure.

As seen in FIG. 3, the first arm 171 forms the first surface 161 and the fourth surface 164. The fourth surface 164 faces the sixth surface 166 and forms a portion of the interior of the clasp frame 111. The first surface 161 is the surface of the first arm 171 that is distal from the sixth surface 166. The second arm 172 forms the third surface 163 and the sixth surface 166. The sixth surface 166 faces the fourth surface 164 and forms a portion of the interior of the clasp frame 111. The third surface 163 is the surface of the second arm 172 that is distal from the fourth surface 164. The connector 173 attaches the first arm 171 to the second arm 172 such that: 1) the first arm 173 is perpendicular to the connector 173; and, 2) the second arm 172 is perpendicular to the connector 173. The connector 173 forms the second surface 162 and the fifth surface 165. The fifth surface 165 is the portion of the interior that connects the fourth surface 164 to the sixth surface 166. The second surface 162 is the surface of the connector 173 that is distal from the fifth surface 165.

Figure 2:
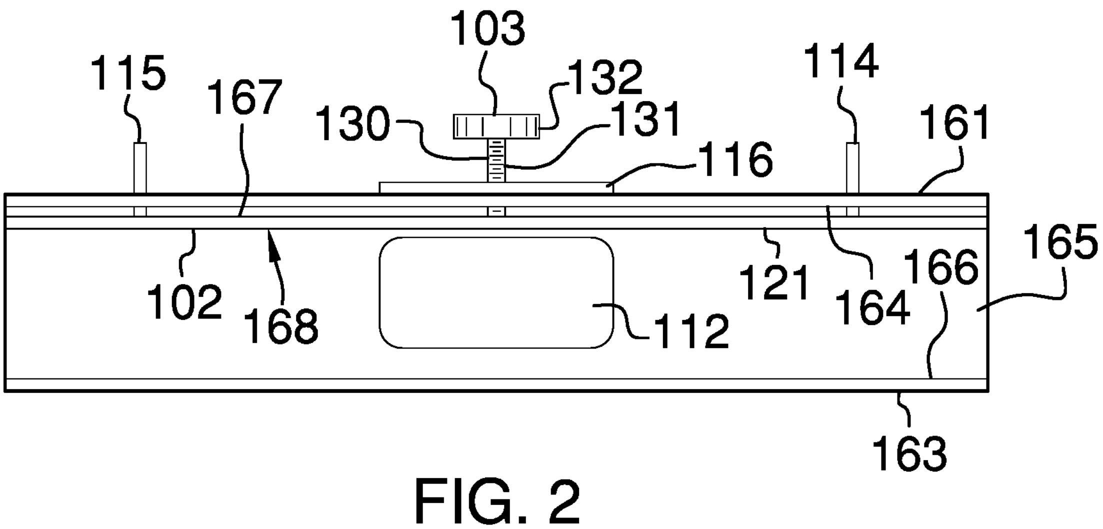
FIG. 2 is a back view of an embodiment of the disclosure.

As shown most clearly in FIG. 2, the aperture 112 is a rectangular opening that is formed in the connector 173 from the second surface 162 through to the fifth surface 165. The perimeter of the aperture 112 is formed to match one of several sizes of latch plates that are used to protect the lock or latch mechanism that is installed in the door slab 151. The open area of the aperture 112 is used to guide a router, which is used to form a mortise which will receive the previously selected latch plate. The first guide hole 114 and the second guide hole 115 are openings that are formed in the first arm 171 of the clasp frame 111. The positioning and use of the first guide hole 114 and the second guide hole 115 are discussed elsewhere in this disclosure.

The thumbscrew hole 113 is further formed with a reinforcing plate 116 and an interior screw thread 118. The thumbscrew hole 113 is designed to receive the thumbscrew 103. The use of the thumbscrew 103 is discussed elsewhere in this disclosure. As shown most clearly in FIG. 3, the reinforcing plate 116 is mounted in the center of the first surface 161. The thumbscrew hole 113 is cylindrical opening that is formed at the center of the fourth surface 164 such that the thumbscrew hole 113 runs through the first arm 171, through the center of the first surface 161 and continues through the reinforcing plate 116. The thumbscrew hole 113 is further formed such that: 1) the center axis of thumbscrew hole 113 is perpendicular to the fourth surface 164; 2) the center axis of thumbscrew hole 113 is perpendicular to the first surface 161; 3) the center axis of thumbscrew hole 113 is perpendicular to the reinforcing plate 116; 4) the center axis of the thumbscrew hole 113 runs through the center of fourth surface 164; 5) the center axis of the thumbscrew hole 113 runs through the center of first surface 161; and, 6) the center axis of the thumbscrew hole 113 runs through the center of the reinforcing plate 116. The purpose of the reinforcing plate 116 is to distribute the load created by the thumbscrew 103 over a larger surface area of the first arm 171. The thumbscrew hole 113 is further formed with an interior screw thread 118.

The purpose of the pressure plate 102 is to distribute the pressure of the thumbscrew 103 across a broader surface area of the door slab 151 during use. The thumbscrew 103 is discussed in more detail elsewhere in this disclosure. The pressure plate 102 is a rectangular plate that comprises a base plate 121, a first guide post 122, and a second guide post 123. The base plate 121 is further defined with a seventh surface 167 and an eighth surface 168. The dimensions of the base plate 121 are sized such that the base plate 121 will fit flush against the fourth surface 164 of the clasp frame 111.

As shown most clearly in FIG. 3, the seventh surface 167 of the base plate 121 is fitted with a first guide post 122 and a second guide post 123. The first guide post 122 is a first cylindrical shaft that projects perpendicularly away from the seventh surface 167. The first guide post 122 is sized such that the first guide post 122 will fit through the first guide hole 114. The second guide post 123 is a second cylindrical shaft that projects perpendicularly away from the seventh surface 167. The second guide post 123 is sized such that the second guide post 123 will fit through the second guide hole 115. The relative positions of the first guide post 122, the second guide post 123, the first guide hole 114, and the second guide hole 115 are placed such that when the first guide post 122 is inserted through the first guide hole 114 and the second guide post 123 is inserted through the second guide hole 115 the seventh surface 167 of the base plate 121 will fit flush against the fourth surface 164 of the first arm 171 such that the perimeter of the seventh surface 167 corresponds to the perimeter of the fourth surface 164.

The purpose of the thumbscrew 103 is to clamp the invention 100 in position around the edge 152 of the door slab 151 such that the aperture 112 can be used as a jig to allow a mortise to be routed in the edge 152 of the door slab 151. The thumbscrew 103 is a commercially available thumbscrew that comprises a shaft 131, a thumbwheel 132, and an exterior screw thread 133. The exterior screw thread 133 is formed on the shaft 131. The shaft 131 and the exterior screw thread 133 are sized such that the thumbscrew 103 can be screwed into the thumbscrew hole 113. The thumbwheel 132 is a disk that is mounted on the end of the shaft 131 such that the thumbscrew 103 can be tightened or loosened by hand as necessary.

To use the invention 100, the pressure plate 102 is attached to the U Channel 101 by inserting the first guide post 122 through the first guide hole 114 and the second guide post 123 through the second guide hole 115. The combination of the U channel 101 and the pressure plate 102 are positioned over the door slab 151 such that the door slab 151 is between eighth surface 168 of the pressure plate 102 and the sixth surface 166 of the second arm 172 in a manner that places the aperture 112 over the edge 152 of the door slab 151 in the position where the mortise is desired. The combination of the U channel 101 and the pressure plate 102 is held in position by screwing the thumbscrew 103 into the thumbscrew hole 113 until the thumbscrew 103 is pressing against the pressure plate 102. The pressure of the thumbscrew 103 is distributed across pressure plate 102 is such a manner that the invention 100 is clamped to the door slab 151 without damaging the door slab 151.

It shall be noted that the template 112 may be used in concert with a plurality of differently-sized template plates 177. The plurality of differently-sized template plates 177 each include a second template 178 that works with the router to form the slot. The plurality of differently-sized template plates 177 includes a plurality of plate pins 179 that correspond with pin holes 180 provided on the second surface 162 of the U channel 101. The pin holes 180 enable the plurality of plate pins 179 of a selected one of the plurality of differently-sized template plates 177 to be secured there against. The second template 178 may correspond with or have a smaller shape or size slot when used with a router.

It shall be noted that the plurality of plate pins 179 may be substituted with screws. Moreover, the pin holes 180 would need to be replaced with threaded holes to facilitate the connection with the screws. This is well known in the art. It shall be noted that the plurality of plate pins 179 may be referred to as a plurality of screws 179. Moreover, the pin holes 180 would be referred to as screw holes 180.

In a first potential embodiment of the disclosure, the U channel 101 and the pressure plate 102 are formed from metal. The first guide post 122 and the second guide post 123 are metal shafts that can be cast with the pressure plate 102 or that can be brazed or welded to the pressure plate 102. Suitable metals include, but are not limited to, aluminum or steel. The thumbscrew 103 is commercially available. In a second potential embodiment of the disclosure, the U channel 101 and the pressure plate 102 are formed from molded plastic. The second potential embodiment of the disclosure is intended to be a single use and disposable product. Suitable plastics include, but are not limited to, high density polyethylene, polyvinylchloride, or acrylonitrile butadiene styrene. Acrylonitrile butadiene styrene is preferred.

The following definitions were used in this disclosure:

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; or, 4) the point, pivot, or axis around which something revolves.

Center Axis: As used in this disclosure, the center axis is the axis of a cylinder or cone like structure. When the center axes of two cylinder or like structures share the same line they are said to be aligned. When the center axes of two cylinder like structures do not share the same line they are said to be offset.

Correspond: As used in this disclosure, the term correspond is used as a comparison between two or more objects wherein one or more properties shared by the two or more objects match, agree, or align within acceptable manufacturing tolerances.

Cylinder: As used in this disclosure, a cylinder is a geometric structure defined by two identical flat and parallel ends, also commonly referred to as bases, which are circular in shape and connected with a single curved surface wherein when the cross section of the cylinder remains the same from one end to another. The axis of the cylinder is formed by the straight line that connects the center of each of the two identical flat and parallel ends of the cylinder. In this disclosure, the term cylinder specifically means a right cylinder which is defined as a cylinder wherein the curved surface perpendicularly intersects with the two identical flat and parallel ends.

Exterior Screw Thread: An exterior screw thread is a ridge wrapped around the outer surface of a tube in the form of a helical structure that is used to convert rotational movement into linear movement.

Interior Screw Thread: An interior screw thread is a ridge wrapped around the inner surface of a tube in the form of a helical structure that is used to convert rotational movement into linear movement Jig: As used in this disclosure, a jig is a device that is used for guiding a tool or for holding an object in place while it is being worked on by a tool or machine.

Mortise: As used in this disclosure, a mortise is a cavity formed in a material that is designed to receive a similarly shaped object such that the similarly shaped object is flush to the surface of the material.

Perimeter: As used in this disclosure, a perimeter is one or more curved or straight lines that bounds an enclosed area on a plane or surface. The perimeter of a circle is commonly referred to as a circumference.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A tool and a kit of different sized template plates comprising:

a U channel, a pressure plate, and a thumbscrew;

wherein the thumbscrew attaches the pressure plate to the U channel;

wherein the tool is adapted for use as a jig;

wherein the tool is adapted for use in routing slots in a door slab such that the door slab can receive a latch plate;

wherein the tool is clamped to the door slab such that an aperture that is formed in the U channel is positioned over the edge of the door slab; wherein the aperture is used as a template that guides the router to create a door latch slot that receives the latch plate;

wherein the U channel is a U shaped structure;

wherein the U channel comprises a clasp frame, an aperture, a thumbscrew hole, a first guide hole, and a second guide hole;

wherein the aperture, the thumbscrew hole, the first guide hole, and the second guide hole are formed in the clasp frame;

wherein the clasp frame comprises a first arm, a second arm, and a connector;

wherein the connector attaches the first arm to the second arm such that the first arm is perpendicular to the connector;

wherein the connector attaches the first arm to the second arm such that the second arm is perpendicular to the connector;

wherein the clasp frame is further defined with a first surface, a second surface, a third surface, a fourth surface, a fifth surface, and a sixth surface;

wherein the first surface and the fourth surface are formed on the first arm;

wherein the second surface and the fifth surface are formed on the connector;

wherein the third surface and the sixth surface are formed on the second arm;

wherein the aperture is a rectangular port that is formed through the connector from the second surface through to the fifth surface;

pin holes formed through the connector from the second surface through to the fifth surface;

wherein the first guide hole is an first opening that is formed in the first arm of the clasp frame;

wherein the second guide hole is a second opening that is formed in the first arm of the clasp frame;

wherein the thumbscrew hole receives the thumbscrew;

wherein the thumbscrew hole is a third opening in the first arm;

wherein the thumbscrew hole includes an interior screw thread that is formed in the third opening;

wherein a reinforcing plate is mounted in the center of the first surface;

wherein a third opening cylindrical port is formed at the center of the fourth surface such that the third opening runs through the first arm;

wherein the third opening is further formed such that the center axis of third opening is perpendicular to the fourth surface;

wherein the third opening is further formed such that the center axis of third opening is perpendicular to the first surface;

wherein the third opening is further formed such that the center axis of third opening is perpendicular to the reinforcing plate;

wherein the center axis of the third opening runs through the center of fourth surface;

wherein the center axis of the third opening runs through the center of first surface;

wherein the center axis of the third opening runs through the center of the reinforcing plate;

wherein the pressure plate is a rectangular structure;

wherein the pressure plate is further defined with a base plate, a first guide post, and a second guide post;

wherein the first guide post and the second guide post are attached to the base plate;

wherein the base plate is further defined with a seventh surface and an eighth surface;

wherein the dimensions of the base plate are sized such that the base plate will fit flush against the fourth surface of the clasp frame;

wherein the plurality of differently-sized template plates includes a plurality of plate pins that correspond with said pin holes provided through the second surface to the fifth surface of the connector;

wherein the pin holes enable the plurality of plate pins of a selected one of the plurality of differently-sized template plates to be secured there against;

wherein the plurality of different sized template plates correspond with or have a smaller shape or size slot when compared to the template of the second surface of the U channel.

2. The tool according to claim 1 wherein the seventh surface of the base plate is formed with a first guide post and a second guide post.

3. The tool according to claim 2 wherein the first guide post is a first cylindrical shaft that projects perpendicularly away from the seventh surface;

wherein the first guide post is sized such that the first guide post will fit through the first guide hole;

wherein the second guide post is a second cylindrical shaft that projects perpendicularly away from the seventh surface;

wherein the second guide post is sized such that the second guide post will fit through the second guide hole.

4. The tool according to claim 3 wherein the relative positions of the first guide post, the second guide post, the first guide hole, and the second guide hole are placed such that when the first guide post is inserted through the first guide hole and the second guide post is inserted through the second guide hole the seventh surface of the base plate will fit flush against the fourth surface of the first arm such that the perimeter of the seventh surface corresponds to the perimeter of the fourth surface.

5. The tool according to claim 4 wherein the thumbscrew comprises a shaft, a thumbwheel, and an exterior screw thread;

wherein the exterior screw thread is formed on the shaft.

6. The tool according to claim 5 wherein the shaft and the exterior screw thread are sized such that the thumbscrew screws into the thumbscrew hole.

7. The tool according to claim 6 wherein the thumbscrew is screwed into the thumbscrew hole such that the thumbscrew applies pressure to the pressure plate; wherein the U channel is formed from a first metal;

wherein the pressure plate is formed from a second metal.

8. The tool according to claim 7 wherein the U channel is formed from a first molded plastic;

wherein the pressure plate is formed from a second molded plastic;

wherein the first molded plastic and the second molded plastic are identical.

9. The tool according to claim 8 wherein the first molded plastic is acrylonitrile butadiene styrene;

wherein the second molded plastic is selected from the group consisting of high density polyethylene, polyvinylchloride, or acrylonitrile butadiene styrene.

10. The tool according to claim 6 wherein the template is used in concert with a plurality of differently-sized template plates;

wherein the plurality of differently-sized template plates each include a second template that works with a router to form the slot;

wherein the plurality of differently-sized template plates includes a plurality of screws that correspond with screw holes provided on the second surface of the U channel;

wherein the screw holes enable the plurality of screws of a selected one of the plurality of differently-sized template plates to be secured there against;

wherein the second template shall correspond with or have a smaller shape or size slot when compared to the template of the second surface of the U channel.

* * * * *